Figures 6, 7:
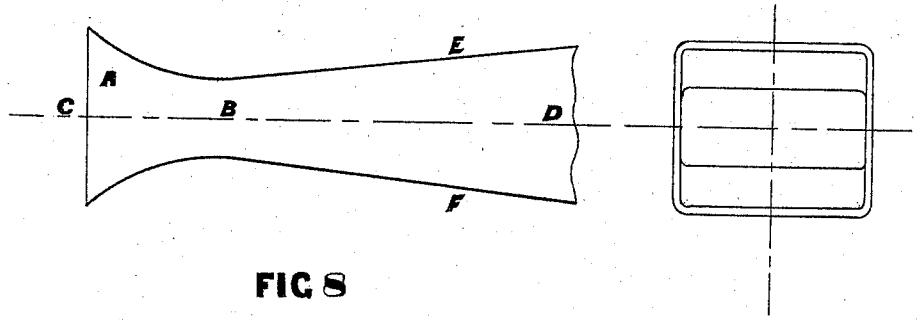

(No Model.) 3 Sheets—Sheet 1.
C. W. JAMES & G. WATSON.
APPARATUS FOR EXHAUSTING, PROPELLING, OR INDUCING CURRENTS IN AIR OR OTHER FLUIDS.
No. 575,241. Patented Jan. 12, 1897.
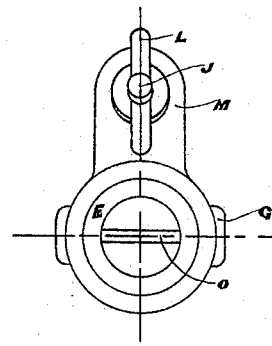
FIG 1
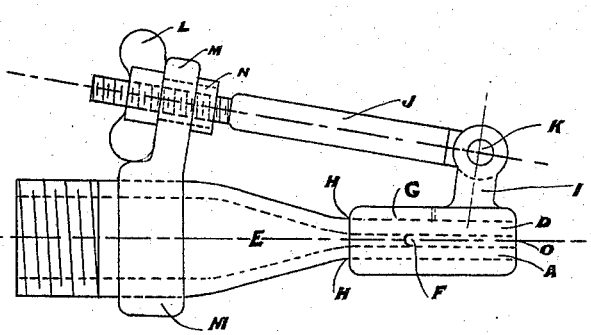
FIG 2
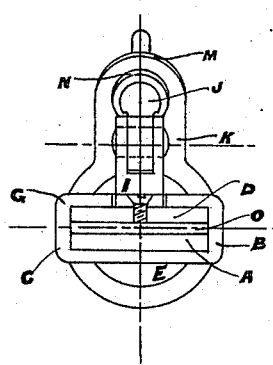
FIG 5
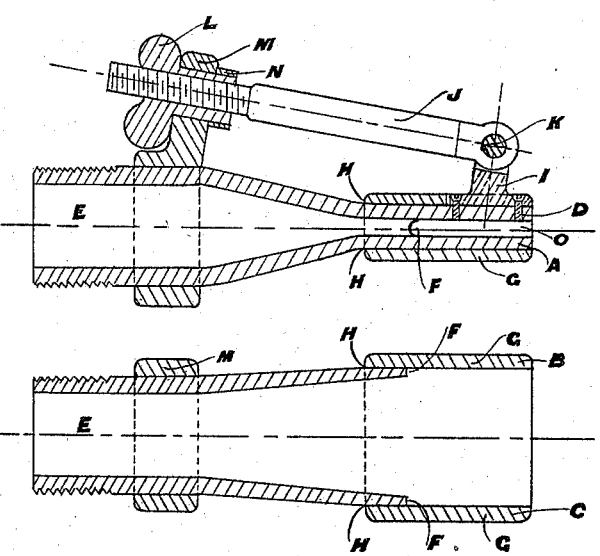
FIG 3
FIG 4

(No Model.) 3 Sheets—Sheet 2.

C. W. JAMES & G. WATSON.
APPARATUS FOR EXHAUSTING, PROPELLING, OR INDUCING CURRENTS IN AIR OR OTHER FLUIDS.

No. 575,241. Patented Jan. 12, 1897.

Witnesses Inventors
Christopher W. James
George Watson.

(No Model.) 3 Sheets—Sheet 3.

C. W. JAMES & G. WATSON.
APPARATUS FOR EXHAUSTING, PROPELLING, OR INDUCING CURRENTS IN AIR OR OTHER FLUIDS.

No. 575,241. Patented Jan. 12, 1897.

Witnesses
Inventors
Christopher W. James
George Watson.

UNITED STATES PATENT OFFICE.

CHRISTOPHER WILLIAM JAMES AND GEORGE WATSON, OF LEEDS, ENGLAND.

APPARATUS FOR EXHAUSTING, PROPELLING, OR INDUCING CURRENTS IN AIR OR OTHER FLUIDS.

SPECIFICATION forming part of Letters Patent No. 575,241, dated January 12, 1897.

Application filed February 12, 1896. Serial No. 579,079. (No model.) Patented in England December 20, 1894, No. 24,751; in Germany September 29, 1895, No. 90,013; in Belgium December 31, 1895, No. 118,775, and in France March 20, 1896, No. 252,271.

*To all whom it may concern:*

Be it known that we, CHRISTOPHER WILLIAM JAMES, engineer, of South View Potternewton Lane Chapel, Allerton, and GEORGE WATSON, engineer, formerly of 2 Woodsley Terrace, but now of 21 Springfield Mount, in the city of Leeds, England, subjects of the Queen of Great Britain, have invented certain new and useful Improvements in Apparatus for Exhausting, Propelling, or Inducing Currents in Air or other Fluids, (for which we have obtained Letters Patent in Great Britain, No. 24,751, bearing date the 20th day of December, 1894; in Germany, No. 90,013, bearing date the 29th day of September, 1895; in Belgium, No. 118,775, bearing date the 31st day of December, 1895, and in France, No. 252,271, bearing date the 20th day of March, 1896,) of which new and useful improvements the following is a specification.

Our invention relates to apparatus for exhausting, propelling, or inducing currents in air or other fluids by means of a motive jet of steam or other fluid and to methods of varying the size and motive force of the jet by causing the motive fluid (whether steam or otherwise) to issue in the form of a jet, having a flat or rectangular or approximately flat or rectangular cross-section, from an orifice of which the size or capacity can be varied at will.

The form which we prefer to give to the before-mentioned adjustable orifice is what is commonly known as a "narrow slit," the object being to cause the issuing or motive jet to be of a thin flat shape, thus insuring that it shall have in proportion to its sectional area a large surface of contact with the fluid to be acted upon. We also make the tube or trumpet into or through which the fluid to be acted upon is to be drawn, driven, or admitted preferably of a flat or rectangular or approximately flat or rectangular cross-section, but it should be so shaped or curved longitudinally (that is to say, in the direction of flow) that variations of cross-section or of form or direction take place gradually, so that it may offer little resistance to the passage of the fluid to be moved or propelled, while at the same time bringing such fluid into close contact with the motive jet. We prefer also to make the nozzle or orifice itself of a curved shape in longitudinal section in order that little resistance may be offered to the issuing jet, but we do not confine ourselves to this form; nor do we confine ourselves to the use of one jet at one time, our invention being applicable to multiple jets arranged either in parallel or in series.

In the drawings, Figure 1 is a rear end elevation of our improved nozzle. Fig. 2 is a side elevation thereof. Fig. 3 is a central vertical longitudinal section. Fig. 4 is a central horizontal longitudinal section, and Fig. 5 is a front end elevation. Figs. 6 to 17 are detail views of the trumpet used in connection with the nozzle.

The three sides A B C of the orifice O are made rigid and the side D adjustable.

The body E of the nozzle is formed by drawing down a piece of tube so as to present at one end a flat or rectangular or approximately flat or rectangular cross-section, as shown in Figs. 3 and 4; but we avoid completely closing up the orifice O while drawing down the said tube by placing in the orifice a piece of steel or other plate of the thickness required for the maximum opening of which we desire the orifice to be capable. The sides of the tube are then sawed or otherwise cut away from the orifice O to a point F, so as to form two jaws A and D, and the ends of the cuts or slits are preferably made round at the point F to avoid any tendency to fracture of the metal at that point. The flat end of the nozzle is then inclosed by means of a box or sleeve G, which fits accurately on the sides B and C of the jaws A and D, and is secured to the lower jaw A by means of screws or brazing or other convenient method. The sides B and C of the box or sleeve G thus form two of the rigid sides of the orifice O, and the lower jaw A, which is secured to the box or sleeve G, as aforesaid, forms the third of the three rigid sides. The joint at H between the box or sleeve G and the body E is made good by brazing, soldering, or other well-known means, so that if any portion of the motive fluid should by chance leak past, between the sides of the jaws A and D and the sides of the box G, at the points B and C, such fluid cannot escape in a reverse direction to the main jet of fluid.

I is a short lever attached firmly to the upper jaw D of the orifice O by screws or other well-known means. The lever I is attached at its upper end by a pin K to a rod J. The rod J is capable of being pushed forward or drawn back by a nut L, which passes through a bracket M, attached firmly to the body E of the nozzle by brazing, screws, or other well-known device. The said nut L is retained in position and prevented from coming out of the hole in the bracket M by means of a collar N, firmly attached to the nut L by a pin or other well-known means. The rod J is threaded for a portion of its length to fit the nut L. Thus it will be seen that if the rod J be threaded with what is known as a "right-hand" thread then upon turning the nut L in a direction contrary to the hands of a watch the rod J and lever I will be pushed forward and the end of the upper jaw D will be forced downward toward the lower jaw A, (the jaw D bending or springing at or near the point F,) and the size of the orifice O will be thus diminished, while by turning the nut L in the same direction as the hands of a watch the rod J and lever I will be drawn back and the end of the jaw D will be drawn upward toward its former position, bending taking place at or near the point F, as aforesaid, and the size of the orifice will be thus increased.

In making nozzles according to our invention from a tube, as aforesaid, we do not confine ourselves to the use of tube having a circular section; but we may use tube having an oval, square, rectangular, or any other section which may from time to time appear suitable, and we may make the bodies of the said nozzles of the required shape by casting, pressing, or otherwise, instead of by drawing them down from a circular or other form, as aforesaid, nor do we confine ourselves to making the body of the nozzle in one piece. It may be built up of several pieces.

*The Tube or Trumpet.*

Figure 8:
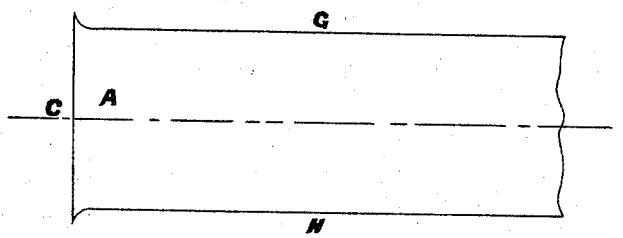

As before stated, the tube or trumpet must be so designed as to bring the fluid to be acted upon into close contact with the motive jet, while offering little resistance to the passage of the fluid. We have designed and herein describe several kinds of tube or trumpet suitable for use with our adjustable jet, as hereinbefore described. The first or simplest form is that described in Figs. 6, 7, and 8, wherein Fig. 6 is a longitudinal section, Fig. 7 is an end elevation, and Fig. 8 is a plan view. The position of the motive jet for the propulsion of the fluid to be acted upon would be preferably at or near the end C of the tube or trumpet.

Figures 9, 10:
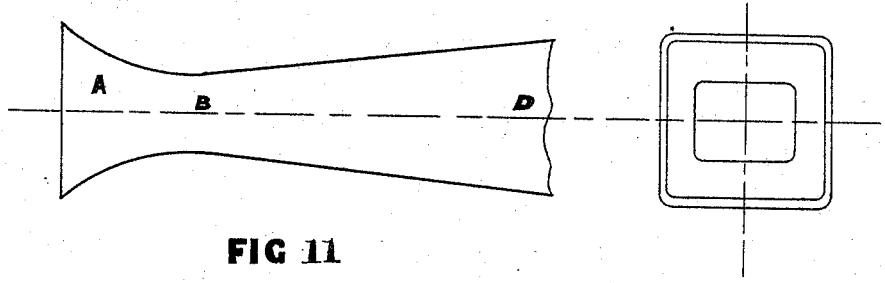
Figure 11:
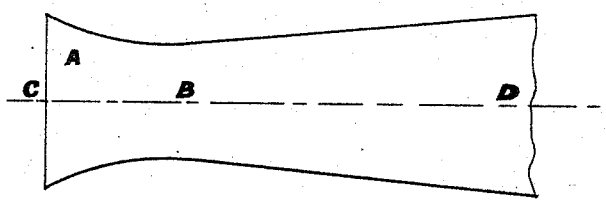
Figures 12, 13:
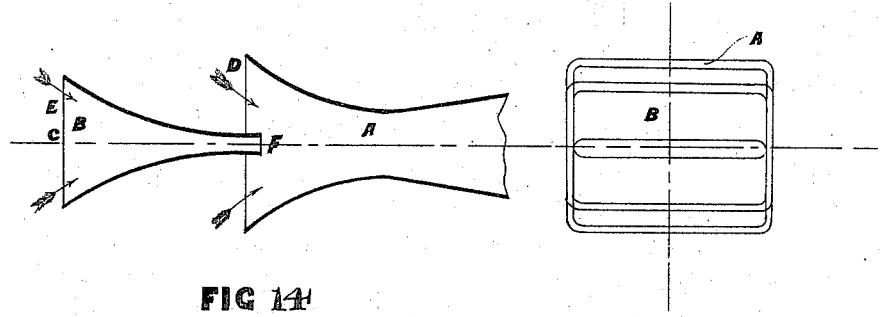
Figure 14:
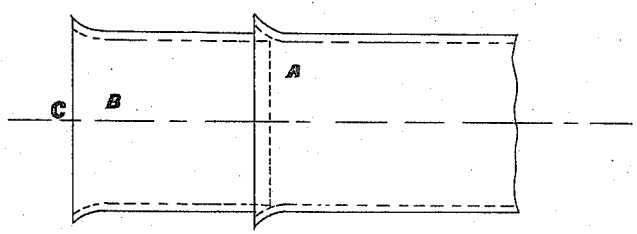

A is the inlet and D the outlet end of the trumpet. At the point B the trumpet is reduced in size in order to bring the fluid to be acted upon into closer contact with the motive jet. The sides E F only of the trumpet are curved, the sides G H being parallel; but in some cases we prefer to make all four sides of the trumpet curved or tapered longitudinally, (that is to say, in the direction of flow,) as shown in Figs. 9, 10, and 11, wherein Fig. 9 is an end elevation, Fig. 10 is a longitudinal section, and Fig. 11 a sectional plan. In this form of tube or trumpet the motive jet is situated at or near the end C, as aforesaid, and the end A is the inlet and the end D the outlet, the smallest part of the tube or trumpet, where the motive jet is brought into intimate contact with the fluid to be moved or propelled, being at B; but we have also found it advantageous in some cases to provide one or more auxiliary trumpets or petticoats within or at the end of the main trumpet, and we have shown in Figs. 12 to 17 a method of making this addition to any of the trumpets above described. Figs. 12 to 14 show how such an arrangement may be applied to a trumpet having only two of its sides curved longitudinally, as aforesaid. Fig. 12 is a sectional elevation, Fig. 13 an end elevation, and Fig. 14 a plan, of such a trumpet having one auxiliary trumpet or petticoat.

The same reference-letters refer to the same parts in each figure.

A is the main trumpet; B, the auxiliary trumpet or petticoat, and the motive jet is situated at or near the point C. The end D of the main trumpet and the end E of the auxiliary trumpet are open for the admission of the fluid to be acted upon. It will thus be seen that the action of the motive jet is to induce a current in the direction of the arrows in the auxiliary trumpet or petticoat B, and the action of the fluid flowing out of the end F of the auxiliary or petticoat trumpet B is to induce a secondary current in the direction of the arrows in the main trumpet A, and thus the total quantity of fluid acted upon is in some cases largely increased.

Figures 15, 16:
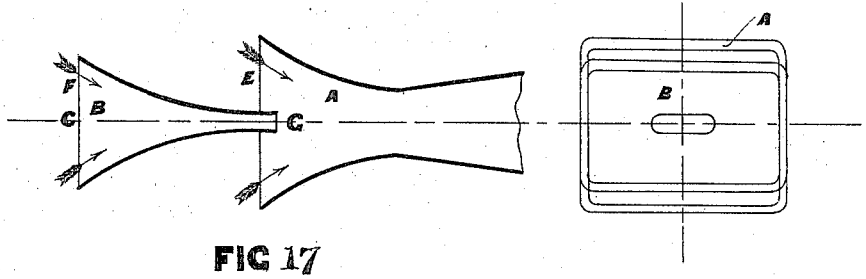
Figure 17:
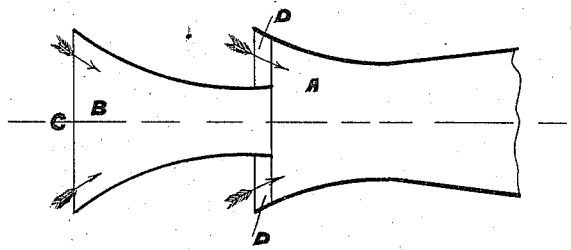

Figs. 15, 16, and 17 show how an auxiliary trumpet or petticoat, as above described, may be applied in the case in which the main trumpet has all its four sides curved or tapered in the direction of flow. Fig. 15 is a longitudinal section, Fig. 16 an end elevation, and Fig. 17 a sectional plan, of such an arrangement.

The same reference-letters refer to the same parts in each of these three figures.

A is the main trumpet, having all its four sides curved or tapered longitudinally.

B is the auxiliary trumpet, having also all its four sides curved or tapered longitudinally.

D are feathers connecting the petticoat B to the main trumpet A, and so constructed as to obstruct the entrance to the main trumpet A as little as possible.

It will be evident that any number of auxiliary trumpets may be arranged one behind or within the other, as may be found convenient, and also that these arrangements, or either of them, may be applied to any of the trumpets described above.

It will also be evident that we may, in combination with any of the trumpets we have described, use any number of motive jets we may deem desirable, and place such jets or any of them in any position with regard to the trumpet or trumpets as we may find advantageous or convenient.

Having now particularly described and ascertained the nature of our said invention and in what manner the same is to be performed, we declare that what we claim is—

1. In apparatus for exhausting, propelling or inducing currents in air or other fluids, the combination of a nozzle having a rectangular discharge-orifice provided with movable and fixed sides, the adjacent faces of said sides having flat, parallel and unbroken surfaces, and means for adjusting said movable side for increasing and diminishing the sectional area of the discharge-orifice, substantially as described.

2. In apparatus for exhausting, propelling, or inducing currents in air or other fluids, the combination of a nozzle having a rectangular discharge-orifice provided with movable and fixed sides, the adjacent faces of said sides having flat, parallel and unbroken surfaces and means for adjusting said movable side for increasing and diminishing the sectional area of the discharge-orifice, and a trumpet arranged over the end of said nozzle and shaped in cross-section to correspond to the cross-sectional shape of the nozzle, said trumpet having flaring ends and an intermediate contracted portion, substantially as described.

3. The combination in a nozzle, of a tube flattened at one end to form a rectangular discharge-orifice and divided at the edges of the flattened portion to form two jaws, a sleeve surrounding said jaws and attached to one of them, and means for adjusting the other jaw toward and away from the fixed jaw, substantially as described.

4. The combination in a nozzle, of a tube flattened at one end to form a rectangular discharge-orifice and divided at the edges of the flattened portion to form two jaws, a sleeve surrounding said jaws, and attached to one of them, a rod pivotally attached at one end to the other jaw, said rod at its opposite end being threaded, and a nut journaled in a bracket fixed on said tube and engaging the threaded end of said rod, substantially as described.

CHRISTOPHER WILLIAM JAMES.
GEORGE WATSON.

Witnesses:
THS. WATSON,
HERBERT S. P. LONDON.